(12) United States Patent
Komatsu

(10) Patent No.: US 10,070,038 B2
(45) Date of Patent: Sep. 4, 2018

(54) IMAGE PROCESSING APPARATUS AND METHOD CALCULATES DISTANCE INFORMATION IN A DEPTH DIRECTION OF AN OBJECT IN AN IMAGE USING TWO IMAGES WHOSE BLUR IS DIFFERENT

(71) Applicant: CANON KABUSHIKI KAISHA, Tokyo (JP)

(72) Inventor: Satoru Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 436 days.

(21) Appl. No.: 14/161,771

(22) Filed: Jan. 23, 2014

(65) Prior Publication Data

US 2014/0210999 A1 Jul. 31, 2014

(30) Foreign Application Priority Data

Jan. 30, 2013 (JP) ................................ 2013-015649

(51) Int. Cl.
*H04N 7/18* (2006.01)
*H04N 5/232* (2006.01)
*G06T 7/571* (2017.01)

(52) U.S. Cl.
CPC ......... *H04N 5/23212* (2013.01); *G06T 7/571* (2017.01); *G06T 2207/10148* (2013.01)

(58) Field of Classification Search
CPC ........ G06T 2207/10148; G06T 7/0069; H04N 5/23212
USPC ...................................................... 348/135
See application file for complete search history.

(56) References Cited

U.S. PATENT DOCUMENTS

| 4,854,679 | A | * | 8/1989 | Tsuji | G02B 15/06 359/673 |
| 4,965,840 | A | | 10/1990 | Subbarao | |
| 8,582,820 | B2 | * | 11/2013 | Kane | G06T 7/0069 382/106 |
| 9,007,476 | B2 | * | 4/2015 | Glover | H04N 5/232 348/211.5 |
| 9,762,788 | B2 | * | 9/2017 | Komatsu | H04N 5/23212 |
| 2001/0022626 | A1 | * | 9/2001 | Nozaki | H04N 5/23212 348/345 |
| 2002/0080257 | A1 | * | 6/2002 | Blank | H04N 5/23216 348/345 |

(Continued)

FOREIGN PATENT DOCUMENTS

| JP | 01-167610 A | | 7/1989 |
| JP | 2010066728 A | * | 3/2010 |
| JP | 2012181324 A | * | 9/2012 |

*Primary Examiner* — Gims S Philippe
*Assistant Examiner* — Yong Joon Kwon
(74) *Attorney, Agent, or Firm* — Fitzpatrick, Cella, Harper & Scinto

(57) ABSTRACT

An image processing apparatus calculates the distance in a depth direction of an object in an image by using a plurality of images whose blur amount is different. The image processing apparatus has: an acquisition unit configured to acquire distance range information for designating a range of a distance to be calculated; a determination unit configured to determine a photographing condition of each of images photographed, on the basis of the distance range information; and a calculation unit configured to calculate the distance by using a plurality of images photographed in the respective photographing conditions determined by the determination unit.

16 Claims, 12 Drawing Sheets

(56) References Cited

U.S. PATENT DOCUMENTS

| | | | |
|---|---|---|---|
| 2006/0165402 A1* | 7/2006 | Ishii | G03B 13/30 |
| | | | 396/123 |
| 2012/0027393 A1* | 2/2012 | Tsuda | H04N 5/23212 |
| | | | 396/102 |
| 2012/0140064 A1* | 6/2012 | Kimura | G01C 3/32 |
| | | | 348/135 |
| 2012/0154355 A1 | 6/2012 | Kawai et al. | |
| 2012/0281132 A1* | 11/2012 | Ogura | H04N 5/23212 |
| | | | 348/348 |
| 2013/0188089 A1* | 7/2013 | Su | G02B 27/0075 |
| | | | 348/345 |

* cited by examiner

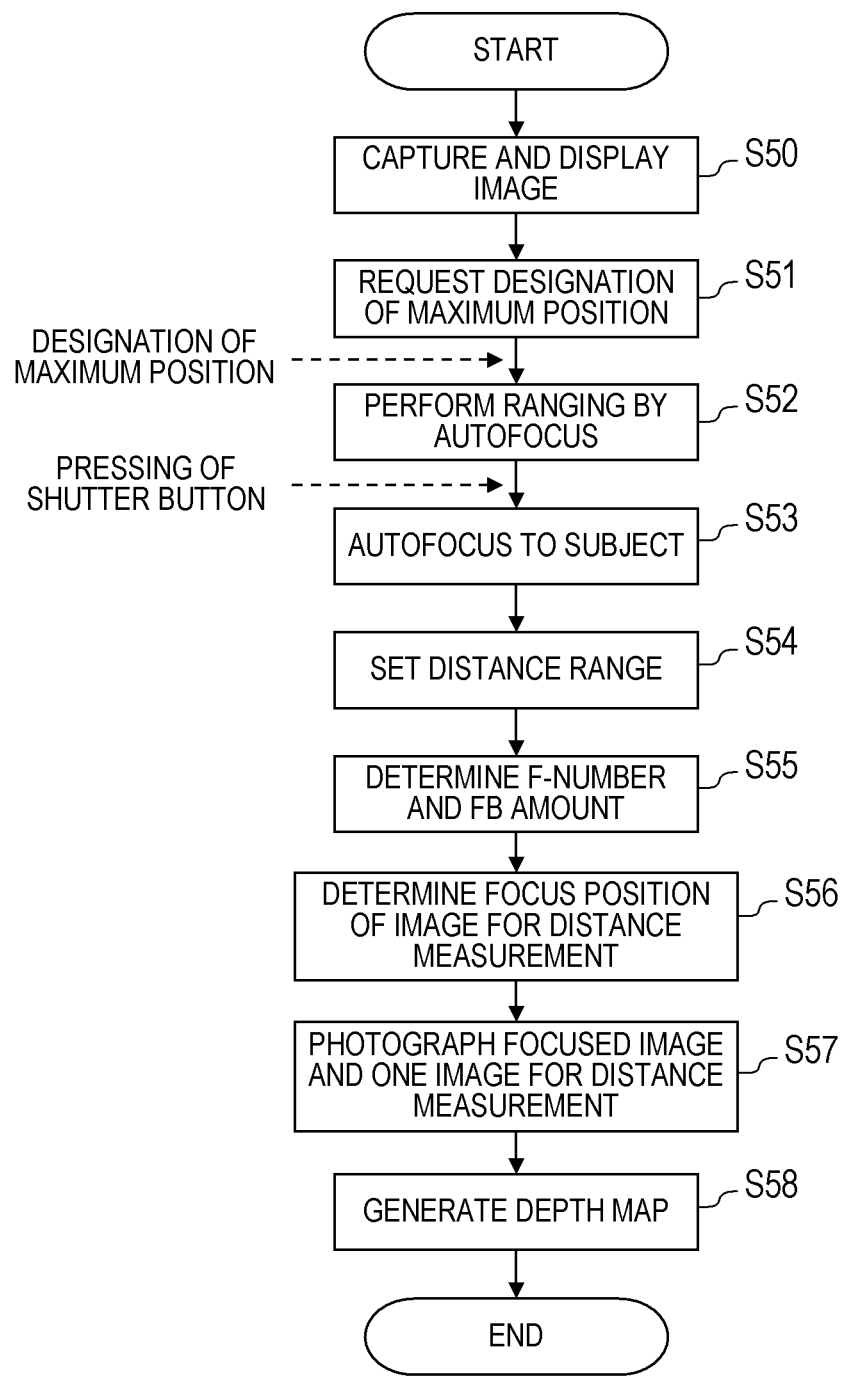

IMAGE PROCESSING APPARATUS AND METHOD CALCULATES DISTANCE INFORMATION IN A DEPTH DIRECTION OF AN OBJECT IN AN IMAGE USING TWO IMAGES WHOSE BLUR IS DIFFERENT

BACKGROUND OF THE INVENTION

Field of the Invention

The present invention relates to a technology of calculating the distance to a subject from a plurality of images that are photographed while photographing conditions are changed.

Description of the Related Art

As a method of acquiring the distance in the depth direction from two-dimensional images acquired by an image pickup apparatus to a subject in the images, there is proposed a depth from defocus (DFD) method as disclosed in Japanese Patent Application Laid-open No. H01(1989)-167610. In the DFD method, a plurality of images whose blur amounts are different are acquired by controlling the photographing condition (also referred to as a photographing parameter) of the imaging optical system, and the size of the blur in each image or a correlation amount of blurs between the images is calculated by using a pixel to be measured and pixels around the pixel.

Since the size of the blur or the correlation amount is changed according to the distance (depth) of the subject in the image, the distance can be calculated by using this relation. In distance measurement by the DFD method, the distance can be calculated by a single imaging system, and therefore, there is an advantage that the distance measurement can be incorporated in an image pickup apparatus of a consumer product such as a compact digital camera.

In the conventional DFD method, by utilizing the change in size of blurs by the imaging optical system according to the distance to the subject, the distance of the subject is estimated on the basis of the size of blurs of a plurality of images. At this time, when the photographing condition of each image is known, the distance can be calculated in theory, and therefore, a preferred photographing condition is not mentioned in Japanese Patent Application Laid-open No. H01(1989)-167610. However, as the present inventors discovered, it is found that how to set the photographing condition of each image influences the estimation accuracy (measurement accuracy) of the distance, or the size of a measurable distance range.

SUMMARY OF THE INVENTION

An object of the present invention is to provide a technology for setting a suitable photographing condition in an apparatus that calculates the distance to a subject by using a plurality of images which are photographed in different photographing conditions.

The present invention in its first aspect provides an image processing apparatus for calculating a distance in a depth direction of an object in an image by using a plurality of images whose blurs are different. The image processing apparatus comprises: an acquisition unit configured to acquire distance range information for designating a range of a distance to be calculated; a determination unit configured to determine a photographing condition of each of the images photographed, on the basis of the distance range information; and a calculation unit configured to calculate the distance by using a plurality of images photographed in the respective photographing conditions determined by the determination unit.

The present invention in its second aspect provides an image pickup apparatus comprising: an imaging unit; and the image processing apparatus according to the present invention. The imaging unit photographs a plurality of images in accordance with photographing conditions determined by the image processing apparatus, and the image processing apparatus calculates the distance in a depth direction of an object in the images, by using the plurality of images that are photographed by the imaging unit.

The present invention in its third aspect provides an image processing method of calculating a distance in a depth direction of an object in an image by using a plurality of images whose blur amounts are different. The image processing method comprises the steps of acquiring distance range information for designating a range of a distance to be calculated; determining a photographing condition of each of the images photographed, on the basis of the distance range information; and calculating the distance by using a plurality of images photographed in the respective photographing conditions that have been determined.

The present invention in its fourth aspect provides a non-transitory computer readable storage medium storing a program that causes an image processing apparatus to implement respective steps of the image processing method according to the present invention.

According to the present invention, a suitable photographing condition can be set in an apparatus that calculates a distance to a subject by using a plurality of images which are photographed in different photographing conditions.

Further features of the present invention will become apparent from the following description of exemplary embodiments with reference to the attached drawings.

BRIEF DESCRIPTION OF THE DRAWINGS

FIG. 5 is a flowchart showing the flow of a process of distance measurement of a second embodiment;

DESCRIPTION OF THE EMBODIMENTS

The present invention relates to a technology for calculating, by using two or more images photographed while changing photographing conditions, the distance in the depth direction of a subject on the basis of a difference in the blurs of these images (also referred to as distance measurement, depth measurement, distance estimation, or depth estimation), and proposes improvement of a so-called DFD method. The present inventors find that the setting of the photographing condition (such as a focusing position and an F-number) of each image can influence distance estimation accuracy, or a measurable distance range. Therefore, in this specification, there is proposed a technology in which information on the designation of the range of a distance to be calculated (measured) (referred to as distance range information) is given by a user or automatically set, and a suitable photographing condition is automatically determined on the basis of the distance range information. Such a technology is implemented as a function of an image processing apparatus (image processing engine) mounted in an image pickup apparatus such as a digital camera and a digital video camera, and utilized for various image processes (ranging, depth map generation, blur addition, and the like) for a photographed image.

Hereinafter, a principle of distance measurement, and the influence of a photographing condition on distance estimation accuracy or a measurable distance range will be described, and thereafter, specific embodiments of the present invention will be illustratively described.

<Principle of Distance Measurement>

Figure 1:
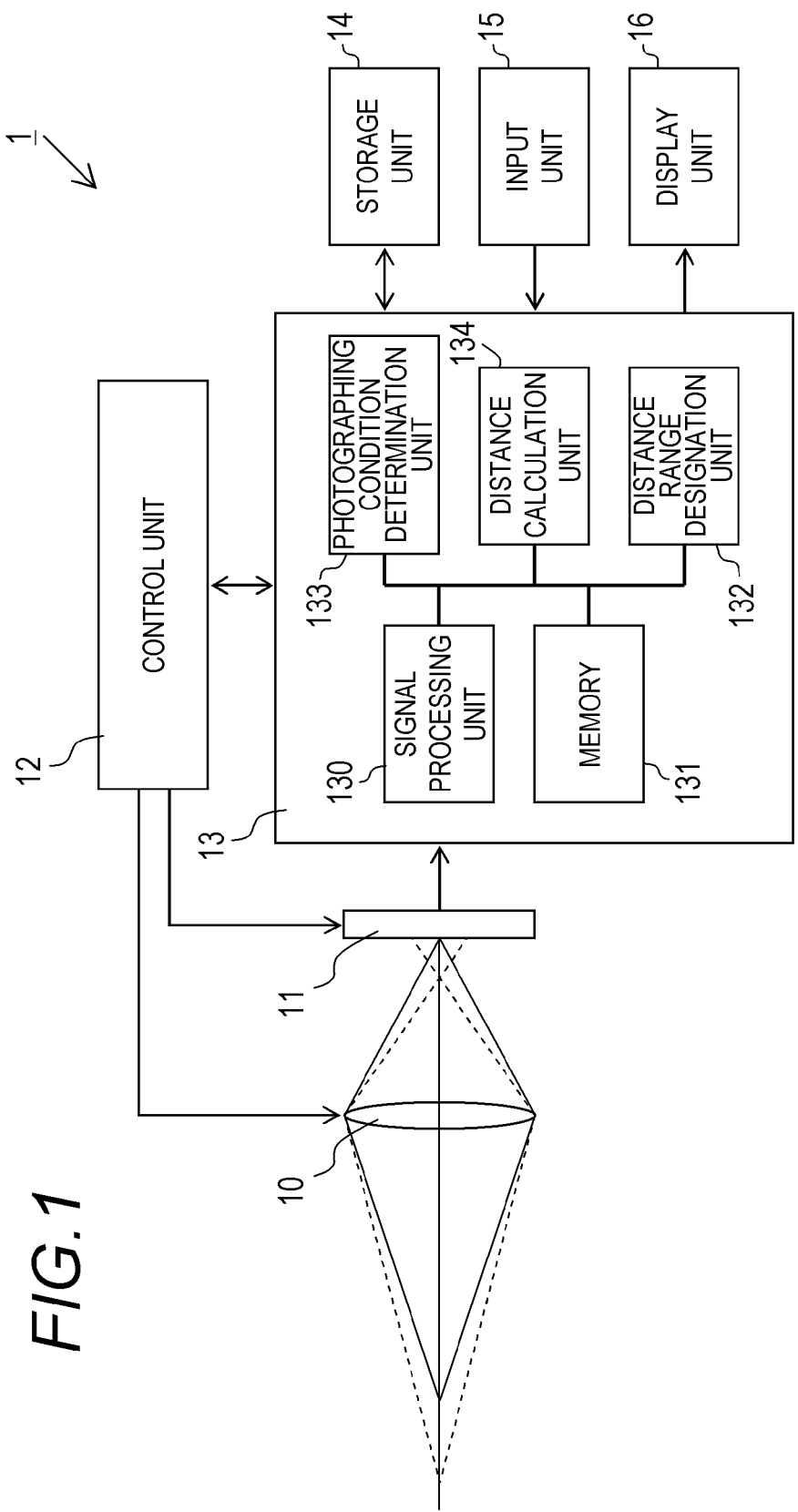
FIG. 1 is a diagram showing a configuration of an image pickup apparatus according to embodiments of the present invention.

FIG. 1 schematically shows a configuration of an imaging optical system, and a focusing position at the time of photographing of an image for distance measurement. In a case where distance measurement is performed, an optical system is first adjusted to a first focusing position (e.g., optical path indicated by a solid line), to photograph a subject. Then, the position of the optical system is changed to a second focusing position (e.g., optical path indicated by a broken line), to photograph the same subject. Consequently, two images whose blurs are different are obtained. The difference between the first focusing position and the second focusing position is referred to as a focus bracket (FB) amount (or focus moving amount). In this specification, the focus bracket amount indicates the moving amount of an image plane (distance between an image plane at the first focusing position and an image plane at the second focusing position), unless stated otherwise.

(Defocusing Characteristic of PSF Peak Value)

In the distance measurement of the present embodiments, a distance is estimated by utilizing a defocusing characteristic of a peak value of a point spread function (PSF) of the optical system. The following description will be made by using a PSF of an ideal imaging optical system with no aberration. Also, in actual imaging optical system, a distance can be estimated similarly.

Figure 8:
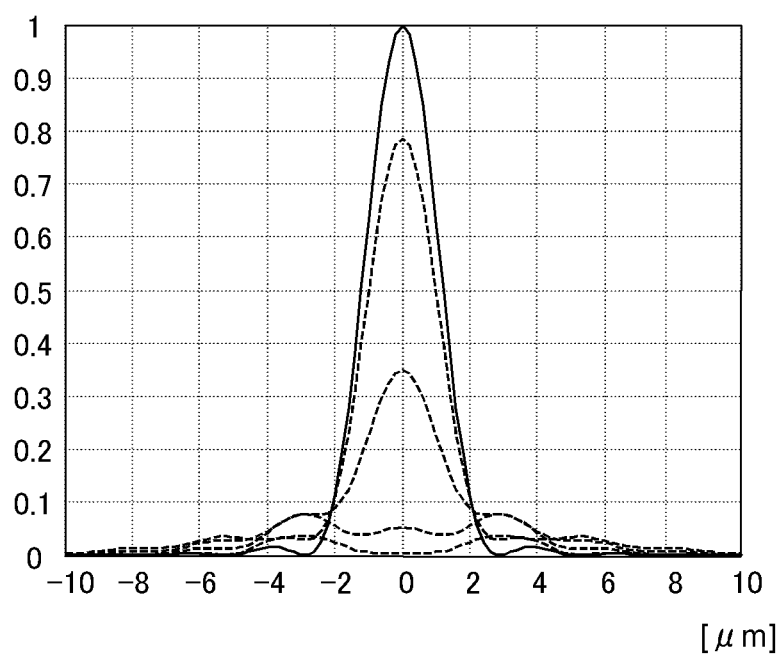
FIG. 8 is a diagram obtained by plotting a cross section of a PSF.

The shape of the ideal PSF with no aberration at a focusing position is a shape like a Gaussian function in which a value on the coordinates at the center of the PSF is a peak, and gradually decreases. In FIG. 8, the sectional shape of the PSF is indicated by a solid line. However, the value at the PSF coordinate center decreases with defocusing, and the shape collapses. The respective dotted lines in FIG. 8 indicate cross-sections of PSFs in cases of defocusing by 20 μm, 40 μm, 60 μm, and 80 μm. In this specification, the value at the coordinate center of the PSF is defined as a "PSF peak value".

Figure 9:
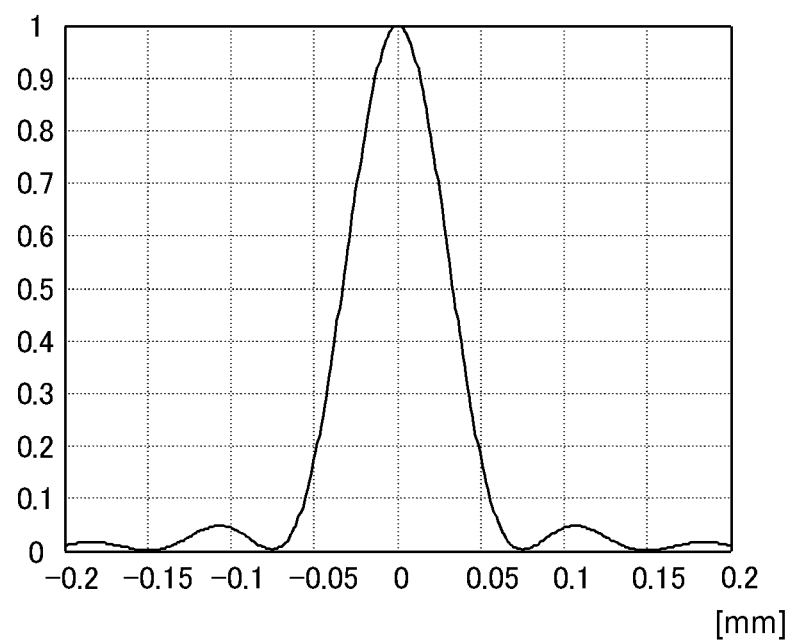
FIG. 9 is a diagram showing a defocusing characteristic of a PSF peak value.

FIG. 9 shows a defocusing characteristic of the PSF peak value in the ideal imaging optical system with no aberration. The abscissa axis represents the defocusing amount, and the ordinate axis represents the PSF peak value. The photographing condition is the focal distance of the imaging optical system: 18.0 mm, the F-number: 4.00, the object distance: 3000 mm, the focus bracket amount: −0.02 mm, and the wavelength: 587.56 e-6 mm. As shown in FIG. 9, the PSF peak value is maximized at the focusing position, and decreases as defocusing to come closer to 0 while vibrating like a SINC function.

(PSF Peak Ratio)

A method of calculating a distance from the PSF peak value will be now described. As shown in FIG. 9, the PSF peak value depends on the defocusing amount. Therefore, when the PSF peak value can be calculated from a photographed image, the defocusing amount is known, thereby enabling conversion into an object distance to a subject. However, since there is the influence of the spatial frequency of the subject or the like, it is difficult to accurately obtain the PSF peak value of the imaging optical system from a single image. Accordingly, the influence of the subject is removed by using a plurality of images that are photographed while photographing conditions are changed. In order to cancel the influence of the subject, it is desirable to compute a ratio. Hereinafter, the ratio of PSF peak values obtained from two images is defined as a "PSF peak ratio". In the distance measurement of the present embodiments, the correspondence between a defocusing characteristic of the PSF peak ratio of the imaging optical system, which is theoretically obtained, and the value of the PSF peak ratio obtained from two images that are obtained by actual photographing is determined, so that the distance is calculated.

Figure 10:
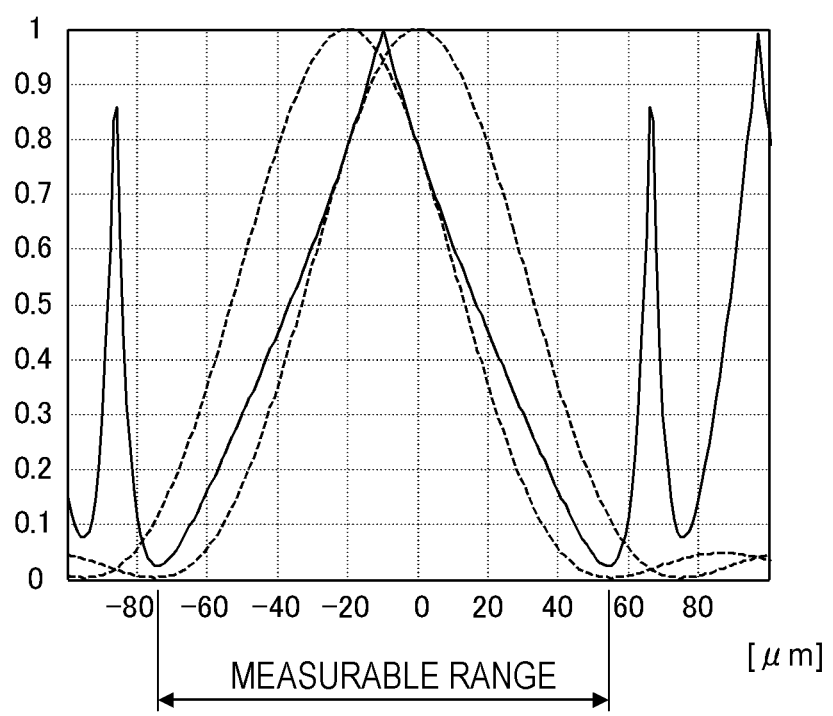
FIG. 10 is a diagram showing a characteristic of a PSF peak ratio.

FIG. 10 shows defocusing characteristics of the respective PSF peak values of the two images, which are theoretically obtained, and the defocusing characteristic of the PSF peak ratio. The photographing condition is the same as the photographing condition of FIG. 9. The abscissa axis represents a focusing position at a side closer to the image plane. In FIG. 10, the two curved line indicated by the dotted lines represent the defocusing characteristic of the two PSF peak values whose focusing positions are different, and the curved line indicated by the solid line represents the defocusing characteristic of the PSF peak ratio.

When the peak ratio is determined, normalization is performed by taking the larger peak value as the denominator. As a result, in the PSF peak ratio, the maximum value is 1, the peak is at the intermediate position of the two focusing positions, and a symmetrical curved line, whose value decreases as its separates from the peak, is formed.

From the two images that are obtained by actual photographing, the PSF peak ratio at each point (pixel or pixel group) in the images is obtained, and the value is applied to the defocusing characteristic indicated by the solid line in FIG. 10, thereby enabling calculation of the distance from an object imaged at each point in the images to a reference focusing position. In a case in FIG. 10, the reference focusing position is the intermediate position between the focusing positions of the two images. Additionally, depending on normalization by using which PSF peak value, the near side (camera side) or the far side with respect to the reference focusing position can be distinguished.

In order to obtain the distance Zo at the object side from the PSF peak ratio, a defocusing amount Zi from a focusing position on the image plane is first obtained from a value of the PSF peak ratio. Then, an image plane-side distance s' is obtained from a focal distance f and an object distance s, and $$s' = \frac{fs}{f+s} \quad \text{(Formula 1)}$$

converted to an object-side distance $$Zo = \frac{f(s' + Zi)}{f + (s' + Zi)} \quad \text{(Formula 2)}$$

by using the defocusing amount Zi.

(Method of Computing PSF Peak Ratio from Image)

A method of calculating a PSF peak ratio from two images that are obtained by actual photographing will be described. Local areas I1 and I2 corresponding to the two images are represented by overlapping a scene s, a PSF 1 and a PSF 2. Assuming that the aforementioned areas subjected to Fourier transformation are denoted by FI1 and FI2, and the Fourier transformation of the scene s is denoted by S, this ratio becomes the following formula.

$$\frac{FI2}{FI1} = \frac{F\{PSF2 \otimes s\}}{F\{PSF1 \otimes s\}} = \frac{OTF2 \cdot S}{OTF1 \cdot S} = \frac{OTF2}{OTF1} = OTFr \quad \text{(Formula 3)}$$

Herein, an optical transmission function obtained by applying Fourier transformation to the PSF is denoted by OTF, and the ratio of two OTF is denoted by OTFr. This OTFr becomes a value that does not depend on a scene by canceling the scenes S as shown in Formula 3.

When a PSF peak ratio PSFr is obtained from this OTFr, the average value of OTFr should be obtained as shown in the following formula. When the peaks of the PSFs are located at the centers of images I1 and I2, the PSF peak ratio PSFr satisfies the following formula.

$$PSFr(0, 0) = F^{-1}\{OTFr(u, v)\}(x = 0, y = 0) \quad \text{(Formula 4)}$$
$$= \frac{1}{\int\int dudv} \int\int OTFr(u, v) dudv$$

This is discretely represented as follows:

$$PSFr(0, 0) = \frac{1}{NuNv}\sum_{i=1}^{Nu}\sum_{j=1}^{Nv} OTFr(u_i, v_j). \quad \text{(Formula 5)}$$

The PSF peak ratio PSFr calculated from images by Formula 5 is applied to the defocusing characteristic of the PSF peak ratio shown in FIG. 10, so that a defocusing amount of an object imaged in the local areas I1 and I2, namely distance information, can be obtained.

(Measurable Range)

A measurable distance range (also referred to as a measurable range or a ranging range) in distance measurement using the PSF peak ratio will be now described with reference to FIG. 10.

As shown in the solid line in FIG. 10, in the defocusing characteristic of the PSF peak ratio, the value gradually decreases from the intermediate position between the different two focusing positions to reach the minimum value, and thereafter rises, which pattern is repeated. This is because the defocusing characteristic of the PSF peak value is vibrated as shown in FIG. 9. Hereinafter, the maximum peak in the defocusing characteristic curved line, such as the PSF peak value and the PSF peak ratio, is referred to as a "maximum peak" or a "primary peak", and each of the minimum values that first appears on the front and back sides of the maximum peak is referred to as a "primary minimum peak".

As apparent from the defocusing characteristic of the PSF peak value in FIG. 9, the PSF peak value after the primary minimum peak is small and is likely to be influenced by noise or the like. Therefore, the variation at the time of taking a ratio is large, and the reliability is low. Accordingly, a reliably measurable distance range is a range between a position of a primary minimum peak on the front side of the maximum peak and a position of the primary minimum peak on the back side of the maximum peak in the defocusing characteristic of the PSF peak ratio (solid line in FIG. 10). Actually, when the PSF peak ratio is close to zero, accuracy is lowered due to noise or the like. Therefore, a range narrower than the range between the primary minimum peak on the front side and the primary minimum peak on the back side is preferably set as a measurable range. In an example of FIG. 10, about −75 μm to 55 μm is the measurable range. The negative direction in the figure is the front side.

Herein, the position of the primary minimum peak of the PSF peak ratio, which defines the measurable range, depends on the positions of the primary minimum peaks of the defocusing characteristics (dotted lines in FIG. 10) of the PSF peak values. That is, the position of the primary minimum peak on the front side of the PSF peak ratio corresponds to the position of the primary minimum peak on the front side of the PSF peak value of the image whose focusing position is located on the back side, among the two images whose focusing positions are different, as shown in FIG. 10. On the other hand, the position of the primary minimum peak on the back side of the PSF peak ratio corresponds to the position of the primary minimum peak on the back side of the PSF peak value of the image whose focusing position is located on the front side. That is, the measurable range is determined by the defocusing characteristics of PSF peak values (interval between primary minimum peaks on the front and back sides) and a focus bracket amount.

When the F-number of an optical system is denoted by F, and the wavelength of light is denote by λ, about $15 F^2 \lambda$ (the reason why the word "about" is used is that the interval between the primary minimum peaks on the front and back sides is exactly a value between $15 F^2 \lambda$ and $16 F^2 \lambda$) can be obtained for an interval between a primary minimum peak on the front side and a primary minimum peak on the back side in the defocusing characteristic of a PSF peak value in the optical system (assuming that aberration does not exist). Therefore, when a focus bracket amount is denoted by FB, the measurable range R is represented by the following formula.

$$R \leq 15 \times F^2 \lambda - FB \quad \text{(Formula 6)}$$

Herein, the measurable range in the optical system with no aberration is indicated. However, in a case of an optical system with aberration, the coefficient "15" of $F^2 \lambda$ needs to be set to a value in conformity with the optical system. Additionally, the measurable range in a case where distance measurement is performed by using an image whose frequency band is not limited by a bandpass filter or the like is indicated herein. Therefore, also in a case where a distance measurement is performed by using an image whose frequency band is limited, the "15" of $F^2\lambda$ needs to be set to a coefficient in accordance with the frequency band used in the distance measurement.

(Characteristic of Focus Bracket Amount and PSF Peak Radio)

A relation of change between a focus bracket amount and a measurable range, and a relation of change between the focus bracket amount and a value range of a PSF peak ratio will be now described.

FIG. 11A to FIG. 11F each show a change of defocusing characteristics of PSF peak values and a change of a PSF peak ratio in a case where a focus bracket amount is changed. The focus bracket amount is the difference in the abscissa axial direction between the defocusing characteristics (dotted lines) of the two PSF peak values. That is, the focus bracket amount gradually increases from FIG. 11A to FIG. 11F. Herein, the value at an intersection point (intersection point of the dotted lines) of defocusing characteristics of two PSF peak values is set to be 99.8%, 90%, 70%, 50%, 20%, and 5% of the maximum value of the PSF peak values in FIGS. 11A to 11F, respectively. It is found that a characteristic of the PSF peak ratio (solid line) is changed with an increase of the focus bracket amount. Specifically, it is found that as the focus bracket amount increases, the measurable range (range between a primary minimum peak position on the front side of the maximum peak of the PSF peak ratio and a primary minimum peak position on the back side) becomes narrow. Such a characteristic is apparent from Formula 6.

The value range of the PSF peak ratio (the difference between the maximum value of the PSF peak ratio and the primary minimum peak) sharply becomes wide as the focus bracket amount increases, and thereafter gradually comes close to 1. As the value range of the PSF peak ratio becomes wide, the distance resolution become high, the resistance against a fluctuation factor, such as noise, becomes high, and the estimation accuracy of the distance is improved. Additionally, as the focus bracket amount increases, the defocusing characteristic of the PSF peak ratio becomes steep, which influences the distance resolution (estimation accuracy). This is because when the inclination of the PSF peak ratio is large, even a slight distance difference causes easier detection of the change in a value of the PSF peak ratio.

Figure 12A:
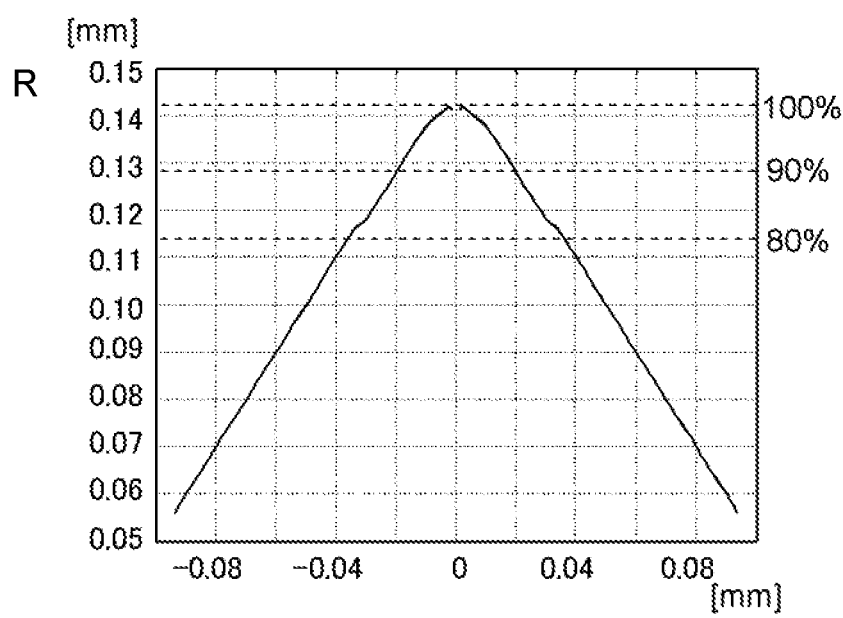
FIG. 12A and FIG. 12B show a measurable range and FB amount dependency of a value range of the PSF peak ratio.
Figure 12B:
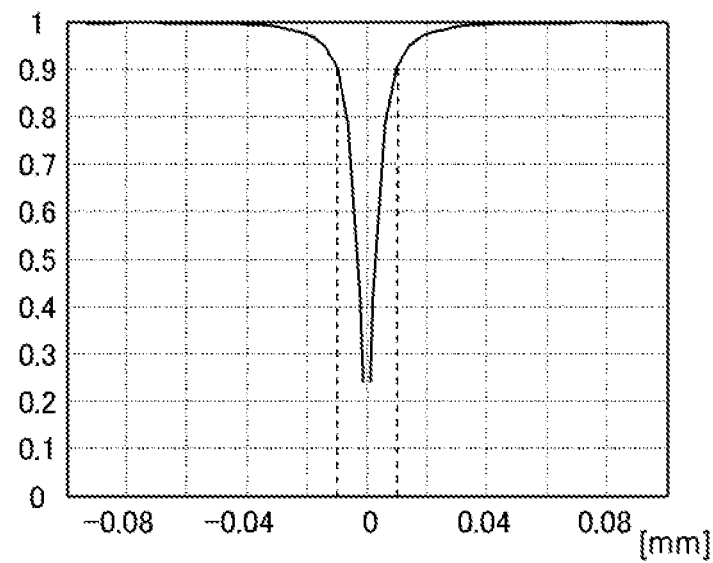

FIG. 12A and FIG. 12B show the change of a measurable range associated with the focus bracket amount, and the change of the value range of the PSF peak ratio, respectively. In FIG. 12A, the abscissa axis represents a focus bracket amount, and the ordinate axis represents a measurable range on an image plane side. Similarly, in FIG. 12B, the abscissa axis represents a focus bracket amount, and the ordinate axis represents a value range. Herein, the PSF peak ratio is normalized, and therefore the maximum value of the value range is 1. In a case where the focus bracket amount is 0, the distance measurement cannot be performed, and therefore, the focus bracket amount becomes a singular point. From FIG. 12A and FIG. 12B, it is found that when the focus bracket amount increases, the measurable range becomes narrow, but the distance resolution (estimation accuracy) is increased.

(Guideline of Optimum Photographing Condition)

As represented in Formula 6, the measurable range (R) is given by a function of the F-number (F), the wavelength ($\lambda$), and the focus bracket amount (FB). As apparent from FIG. 12A and FIG. 12B, when the focus bracket amount (FB) changes, not only the measurable range (R), but also the distance resolution (estimation accuracy) changes. Therefore, in a case where a measurement condition, such as a desirable distance range or accuracy, is given, it is desired to suitably set a photographing condition, such as a focusing position and an F-number of an optical system, at the time of photographing each image.

The basic concept is as follows. As the distance range to be measured becomes narrower, the F-number at the time of photographing of two images is preferably made smaller. This is because as the F-number decreases, the depth of field becomes narrow (the defocusing characteristic of the PSF peak ratio becomes steep), and therefore improvement of the distance resolution (estimation accuracy) can be expected. The focus bracket amount at this time should be appropriately determined in accordance with the F-number. In a case of an image pickup apparatus whose F-number cannot be changed, as the distance range to be measured becomes narrower, the focus bracket amount should be increased. As described above, this is because as the focus bracket amount is made larger, distance resolution (estimation accuracy) is improved.

An example of a specific method of determining an F-number and a focus bracket amount will be described. First, the F-number (F) and the focus bracket amount (FB) are designed by using the following relational expression. That is, the focus bracket amount is grasped as an amount proportional to the depth of field. In Formula 7, k denotes a coefficient for adjusting the magnitude of the focus bracket amount, and $\lambda$ denotes a wavelength.

$$FB = kF^2\lambda \quad \text{(Formula 7)}$$

A formula obtained by assigning Formula 7 to Formula 6 is the following Formula 8.

$$R \leq (15-k) \times F^2\lambda \quad \text{(Formula 8)}$$

For example, in a case where a distance range r to be desired to be measured as a measurement condition is given, an F-number that satisfies the distance range r can be determined by using Formula 8 (assuming that the coefficient k and the wavelength $\lambda$ are previously determined). Specifically, the F-number is determined such that $r \leq R$, namely, $$F \geq \sqrt{\frac{r}{(15-k) \times \lambda}} \quad \text{(Formula 9)}$$

is satisfied. For example, a minimum F-number that satisfies Formula 9 is simply selected among F-numbers that can be set by an imaging optical system.

Then, by substituting the F-number into Formula 7, a focus bracket amount FB can be determined. The respective focusing positions at the time of photographing of two images (positions on the image plane side) are simply determined as rc−FB/2 and rc+FB/2 on the basis of the center position rc of the distance range r. By the aforementioned method, the F-number, the focus bracket amount, and the respective focusing positions of the two images can be determined by setting the measurable range R as a measurable photographing condition.

(Coefficient k)

A preferable value of the coefficient k will be now described. By a simulation and an experiment, the present inventors find the preferable value of the coefficient k as described below. The coefficient k should be a value in the range of 0<k<15. When k is larger than 15, the blur of a subject becomes too large, and measurement accuracy is lowered. The reason why k=0 is excluded is that the difference between blurs cannot be obtained from images whose focusing positions are the same.

In a case where the purpose of the distance measurement is two layer separation of distance, namely, to determine whether or not a subject is included in a specified distance range, the coefficient k is preferably set to a value in the range of 8<k<15. As the coefficient k increases, the focus bracket amount increases, and the measurable range becomes narrow (see FIG. 11E and FIG. 11F). The narrow measurable range means that the value of the PSF peak ratio is greatly changed, depending on whether or not the subject exists around a specified distance. Accordingly, in a case of two layer separation, it is better that the focus bracket amount is made larger to some extent.

Figure 11A:
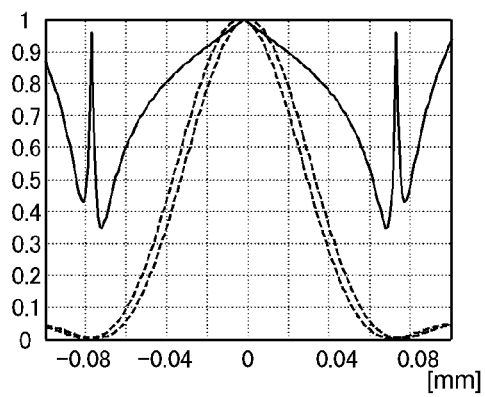
FIG. 11A to FIG. 11F are diagrams showing a change of a PSF peak ratio with a change of an FB amount.
Figure 11B:
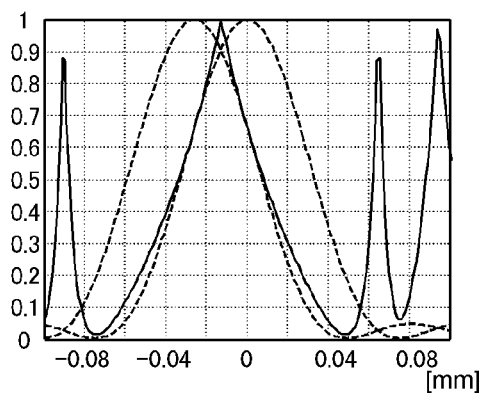
Figure 11C:
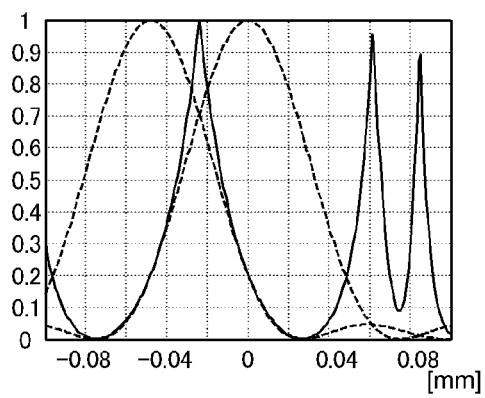
Figure 11D:
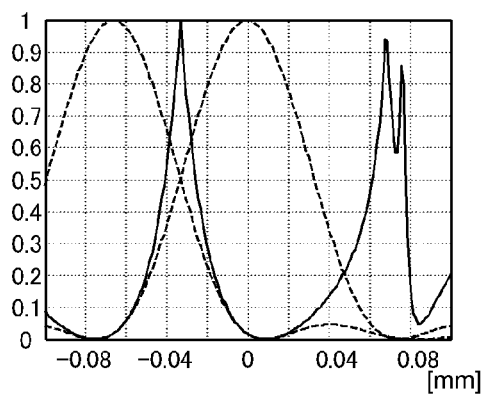
Figure 11E:
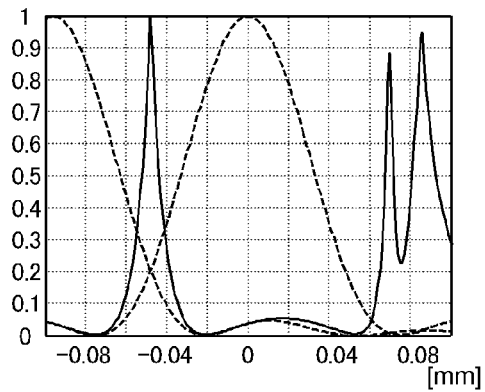
Figure 11F:
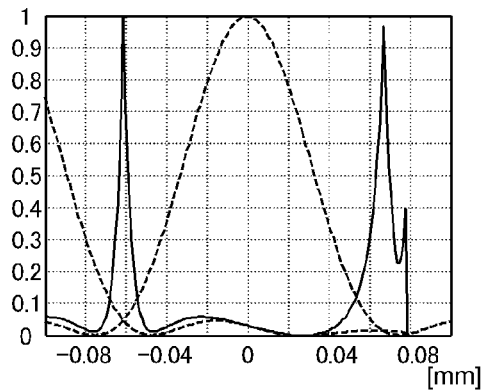

On the other hand, in a case where the purpose of the distance measurement is multi-layer separation of distance, namely, to determine whether or not a subject is included in at least three specified distance ranges, the coefficient k is preferably set to a value in the range of 1<k≤8. This is because as the coefficient k decreases, the focus bracket amount decreases, and the measurable range becomes wide, and therefore it is suitable for separation of two or more layers, as shown in FIG. 11B to FIG. 11D. The reason why the range of 0<k≤1 is excluded is that in this case, while the measurable range becomes wide, the distance resolution is lowered, and therefore, it is not suitable of multi-layer separation (see FIG. 11A).

Furthermore, it is suitable that the coefficient k is a value in the range of 2≤k<4. In this range, the balance of the width of the measurable range and the distance resolution is particularly preferable, and measurement in a wide distance range can be performed with high accuracy (see FIG. 11B and FIG. 11C).

As described above, the value of the coefficient k is simply appropriately set in the range of 0 to 15 in accordance with the purpose of distance measurement.

<First Embodiment>

(Configuration of Image Pickup Apparatus)

FIG. 1 schematically shows the configuration of an image pickup apparatus according to a first embodiment of the present invention. An image pickup apparatus 1 has an imaging optical system 10, an image pickup device 11, a control unit 12, an image processing apparatus 13, a storage unit 14, an input unit 15, and a display unit 16.

The imaging optical system 10 is configured by a plurality of lenses, and an optical system that images incident light on an image plane of the image pickup device 11. As the imaging optical system 10, a variable focus optical system is used, and automatic focusing is possible by an autofocus function of the control unit 12. Autofocusing system may be a passive system or an active system. The image pickup device 11 is an image pickup device that has an image sensor, such as a CCD and a CMOS. The image pickup device 11 may be an image pickup device that has a color filter, a monochrome image pickup device, or a three-plate type image pickup device.

The image processing apparatus 13 has a signal processing unit 130, a memory 131, a distance range designation unit 132, a photographing condition determination unit 133, a distance calculation unit 134, and the like. The signal processing unit 130 is a function of performing various signal processes, such as AD conversion of analog signals output from the image pickup device 11, noise removal, demosaicing, brightness signal conversion, aberration correction, white balance adjustment, and color correction. Digital image data output from the signal processing unit 130 is stored in the memory 131, and is available for display on the display unit 16, recording (storage) in the storage unit 14, distance measurement, and the like. The distance range designation unit 132 performs the function of designating a range of a distance to be calculated in distance measurement process. This distance range may be designated by a user, or may be automatically determined by the image processing apparatus 13. In the first embodiment, a method of designating a distance range by a user will be described. The photographing condition determination unit 133 performs the function of determining photographing conditions of a plurality of images used in distance measurement on the basis of the range designated by distance range information. The distance calculation unit 134 performs the function of calculating the distance in the depth direction to an object in an image. The detailed operation of the distance measurement will be later described.

The storage unit 14 is a non-volatile storage medium that stores photographed image data, parameter data utilized in the image pickup apparatus 1, and the like. As the storage unit 14, any storage medium may be utilized as long as the storage medium can read and write at a high speed and is a mass storage medium. For example, a flash memory or the like is preferable. The input unit 15 is operated by a user, and an interface for performing information input or setting a change with respect to the image pickup apparatus 1. For example, a dial, a button, a switch, a touch panel, or the like can be utilized. The display unit 16 is display means configured by a liquid crystal display, an organic EL display, or the like. The display unit 16 is utilized for confirmation of a composition at the time of photographing, inspection of images that are photographed and stored, display of various setting screens or message information, and the like. The control unit 12 performs the function of controlling each unit of the image pickup apparatus 1. Examples of the function performed by the control unit 12 include, for example, automatic focusing by autofocusing (AF), changing of a focusing position, changing of an F-number (aperture), capturing of an image, control of shutter or flash (not shown), controlling of the storage unit 14, the input unit 15, the display unit 16, and the like.

(Distance Measurement)

Figure 2:
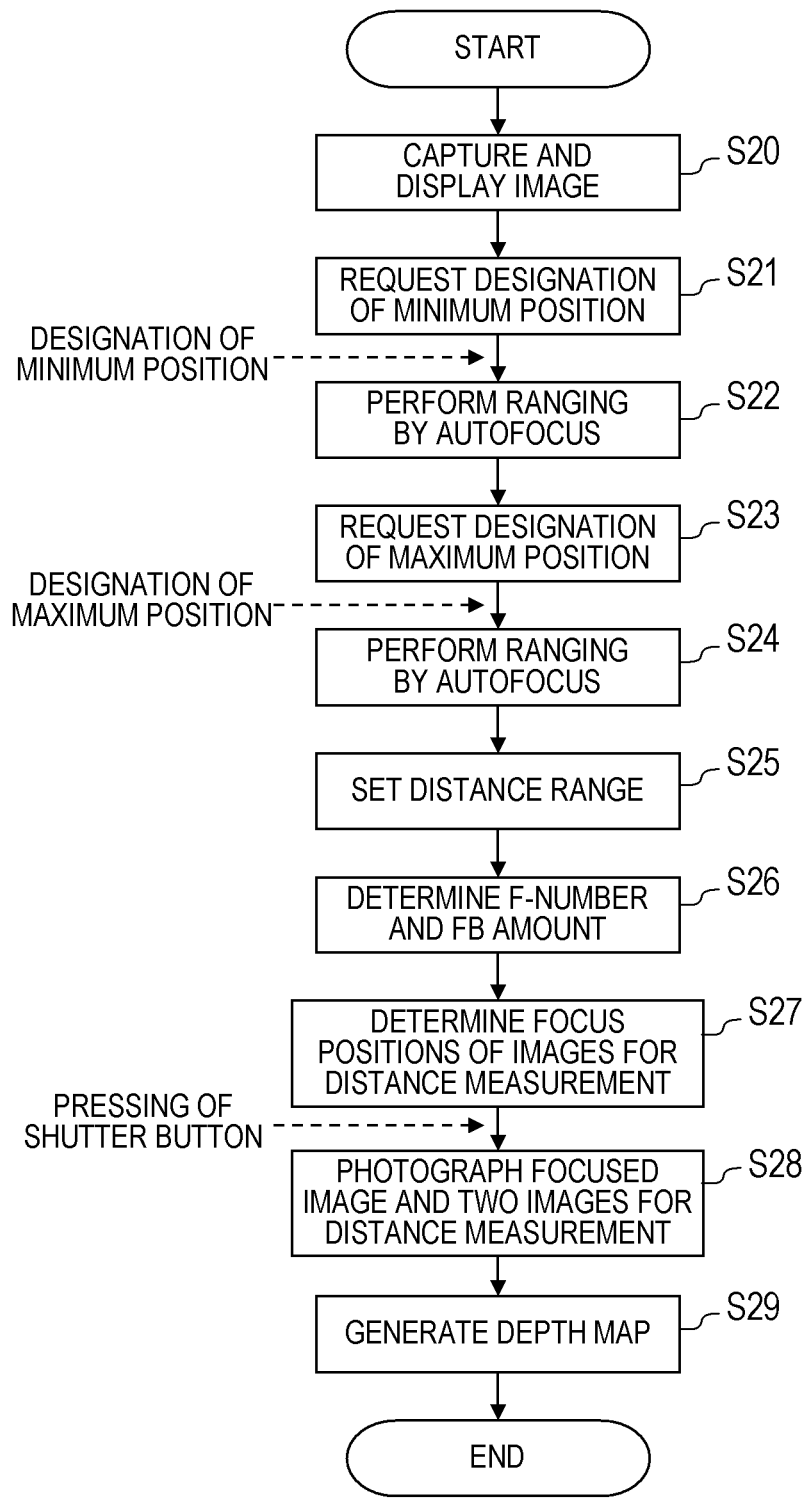
FIG. 2 is a flowchart showing the flow of a process of distance measurement of a first embodiment.
Figure 3A:
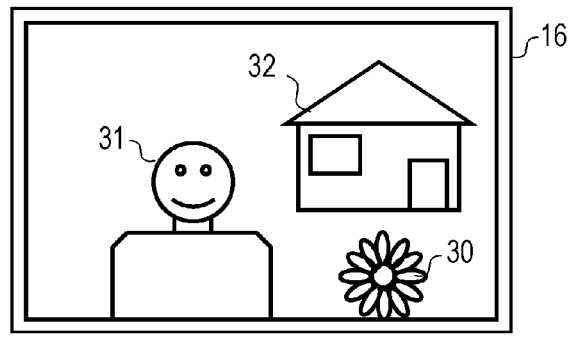
FIG. 3A and FIG. 3B are diagrams for illustrating the designation of a distance range and setting of a photographing condition according to the first embodiment.
Figure 3B:
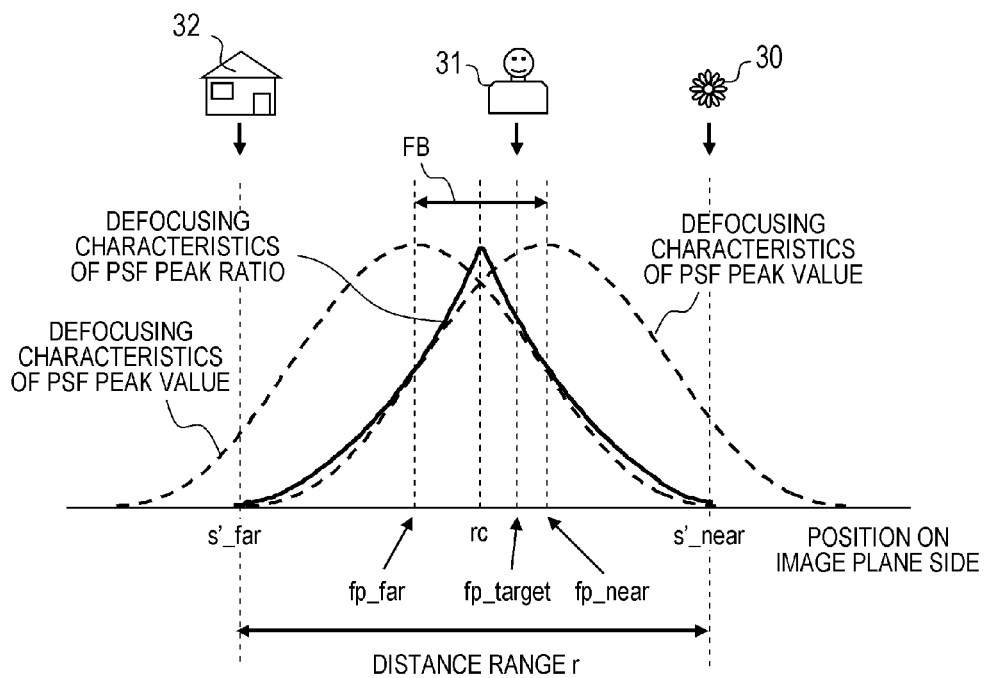

The operation associated with distance measurement of the image pickup apparatus 1 will be described with reference to FIG. 2, FIG. 3A, and FIG. 3B. FIG. 2 is a flowchart showing the flow of the distance measurement operation. FIG. 3A and FIG. 3B are diagrams for illustrating designation of a distance range and setting of a photographing condition.

When a user operates the input unit 15 to instruct the apparatus to perform distance measurement, capturing of images starts from the image pickup device 11, and the images captured via the signal processing unit 130 and the memory 131 are sequentially displayed on the display unit 16 (Step S20). FIG. 3A shows an example of an image displayed on the display unit 16. In the image, a flower 30, a person 31, and a house 32 are imaged in this order from the front. Hereinafter, a user operation for acquiring an image, in which the person 31 is focused, and acquiring distance information from the flower 30 to the house 32, and processes performed by the image pickup apparatus 1 will be described.

First, the distance range designation unit 132 requests the user to designate the shortest position (lower limit of a distance range) (Step S21). For example, a guide message mentioning that "touch the nearest point" is simply overlay displayed on the display unit 16. When the user touches an arbitrary point (part of the flower 30 in the example of FIG.

3A) on the image, the control unit 12 performs automatic focusing with respect to an object (flower 30) imaged on the point (Step S22). Consequently, it is possible to acquire the object distance s_near to the flower 30 from the imaging optical system 10. Then, the distance range designation unit 132 requests the user to designate the longest position (upper limit of the distance range) (Step S23). For example, a guide message mentioning that "touch the farthest point" is simply overlay displayed on the display unit 16. When the user touches an arbitrary point (part of the house 32 in the example of FIG. 3A) on the image, the control unit 12 performs automatic focusing with respect to an object (house 32) imaged on the point (Step S24). Consequently, it is possible to acquire the object distance s_far to the house 32 from the imaging optical system 10. Herein, the shortest position and the longest position are designated in this order. However, the user may designate the two points in an arbitrary order, and determine the shorter distance and the longer distance as s_near and s_far, respectively.

The distance range designation unit 132 sets the distance range, which is a target of the distance measurement, on the basis of the object distances s_near and s_far of the two points, which are obtained in Steps S22 and S24 (Step S25). Specifically, the distance range designation unit 132 converts the object distances s_near and s_far of the two points into distances s'_near and s'_far on the image plane side respectively, by a focal distance f of the imaging optical system 10 and Formula 1, to set s'_near and s'_far as the lower limit of the distance range and the upper limit of the distance range, respectively. The values of s'_near and s'_far are distance range information. Thus, the distance range designation unit 132 acquires the distance range information. Then, the distance range information is passed to the photographing condition determination unit 133.

The photographing condition determination unit 133 determines an F-number and a focus bracket (FB) amount such that the distance range r designated by s'_near and s'_far (=s'_near−s'_far) is within the measurable range R of Formula 6 (Step S26). At this time, the F-number and the focus bracket amount may be determined by using the aforementioned Formula 9 and Formula 7, or the F-number and the focus bracket amount corresponding to the distance range r may be obtained with reference to a photographing condition table previously prepared. In the light of speeding up of the process, a method using a table is more preferable. Table 1 is an example of the photographing condition table in a case of coefficient k=3.3, and wavelength λ=550 nm.

TABLE 1

| Distance Range [mm] | F-Number | FB Amount [µm] |
|---|---|---|
| 0 to 0.025 | 2.0 | 7 |
| to 0.05 | 2.8 | 14 |
| to 0.10 | 4.0 | 29 |
| to 0.15 | 5.0 | 45 |
| to 0.20 | 5.6 | 57 |
| to 0.30 | 7.1 | 92 |
| to 0.40 | 8.0 | 116 |
| to 0.50 | 11 | 220 |

For example, in a case of lower limit distance s'_near=10.204 mm, and upper limit distance s'_far=10.010 mm, the distance range r is distance range r=10.204−10.010=0.194 mm, and the F-number=5.6, and the FB amount=57 µm are selected as the photographing condition. Table 1 shows an example of coefficient k=3.3. However, the value of the coefficient k may be any value of 0 to 15. Alternatively, tables of a plurality of kinds of values of k may be prepared, and one of the tables may be selected in accordance with the purpose of the distance measurement (a two layer separation, a multi-layer separation, emphasis on a range, emphasis on resolution, or the like). In a case where the distance range r designated by the user exceeds the measurable range R that is the maximum range of the distance that can be calculated from two images, the photographing condition cannot be set. In this case, an error message mentioning that "a distance range is too wide" or the like is simply output to the display unit 16, to make the user redesignate the distance range.

The photographing condition determination unit 133 calculates a focusing position at the time of photographing of two images used in the distance measurement (Step S27). For a far side focusing position, fp_far, fp_far=rc−FB/2 is obtained on the basis of the center position rc of the distance range r, and for a near side focusing position, fp_near, fp_near=rc +FB/2 is obtained. In the aforementioned example, the center position rc is rc=(s'_near+s'_far)/2=10.107 mm, and the FB amount is FB=0.057 mm, and therefore the far side focusing position fp_far is 10.0785 mm, and the near side focusing position fp_near is 10.1355 mm. The established photographing condition (F-number, two focusing positions fp_near and fp_far) is sent to the control unit 12.

When the photographing condition is established, the control unit 12 displays a guide message displaying the message "photograph please" on the display unit 16. When the user focuses a desired subject (person 31 in the example of FIG. 3A), and presses a shutter button, the control unit 12 automatically switches the F-number, captures an image focused on the subject (referred to as a focused image), and also captures respective images at the far side focusing position fp_far and the near side focusing position fp_near (referred to as images for distance measurement) (Step S28). That is, three images are captured according to the aforementioned photographing condition, to be stored in the memory 131.

FIG. 3B schematically shows the relation among the distance range r (s'_near and s'_far) designated by the user, the focusing positions (fp_near and fp_far) of the two images for distance measurement, the focusing position of the focused image (fp_target), the defocusing characteristics of the PSF peak value and the PSF peak ratio, and the like. It is found that the range from the flower 30 to the house 32 is covered by the measurable range by the PSF peak ratio.

The focused image and the two images for distance measurement may be photographed in any order, but it is better to determine a photographing order such that the focusing position is gradually moved to the near side (or the far side). For example, as in FIG. 3B, in a case where the focusing position fp_target of the focused image is located between the far side focusing position fp_far and the near side focusing position fp_near of the images for distance measurement, the focused image is simply photographed second. Consequently, the moving amount of the focusing position becomes a minimum, so that the photographing time can be shortened. In a case where the focusing position fp_target of the focused image is out of the measurable range by the PSF peak ratio, an error message stating that "the subject is out of the measurable range" is simply output to the display unit 16, thereby making a user to designate the distance range again or to capture the focused image again.

The distance calculation unit 134 calculates a value of a PSF peak ratio of local areas I1 and I2 corresponding to the two images for distance measurement, to calculate the distances in the depth direction of an object imaged in the local areas I1 and I2 from the value. The method of calculating the distance is indicated in Formula 1 to Formula 5. The size of each local area is arbitrary. The distance can be calculated for each pixel, or the distance may be calculated for each pixel group (area) of several pixels to more than a dozen pixels. When calculating the distances of all of the local areas in the images, the distance calculation unit 134 generates data in which the image coordinates of each local area is associated with a corresponding distance (Step S29). This data is referred to as a depth map. The distance calculation unit 134 saves the generated depth map in the storage unit 14 along with the data of the focused image captured in Step S28.

The depth map obtained herein can be utilized, for example, for a process of adding a blur according to the distance to the focused image, a process of three-dimensionally converting the focused image, a process of recognizing a three-dimensional position from the focused image, and the like.

(Advantage of this Embodiment)

According to this embodiment described above, the respective photographing conditions (the F-number and the two focusing positions in this embodiment) of the images for distance measurement are determined on the basis of the distance range designated by the user. Consequently, an image that is suitable for measurement of the designated distance range can be acquired automatically (namely, without consciousness of the photographing condition by the user). At this time, the F-number and the difference (FB amount) between the two focusing positions are determined such that the distance range designated by the user is within the measurable distance range from the two images, and hence the accuracy of distance calculation to the designated distance range can be secured.

Additionally, according to this embodiment, the image captured in the image pickup apparatus is displayed, and a user interface for designating two points on the image is provided, and therefore the user can designate a desired distance range with an easy and intuitive operation. In a case where the distance range designated by the user exceeds the measurable range, the user is encouraged not to calculate the distance, but to redesignate the distance range, and therefore it is possible to prevent the accuracy of distance calculation from decreasing due to inappropriate range designation.

(Method of Designation of Distance Range)

In the aforementioned first embodiment, the user interface for designating two points on an image by a user is described. However, the method of designating a distance range is not limited to this, and any method may be employed.

Figure 4A:
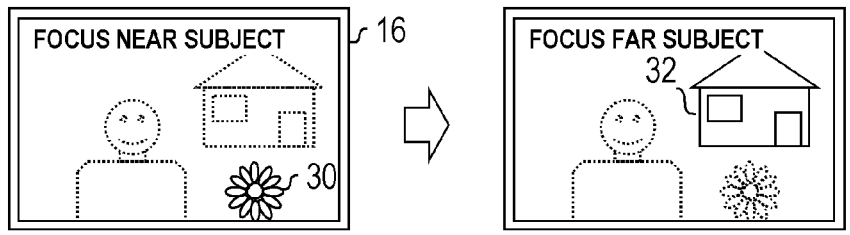
FIG. 4A to FIG. 4D are diagrams showing the variations of a method of designating the distance range.

FIG. 4A shows an example of a method of making a user perform an operation of automatic focusing twice. First, the display unit 16 displays a guide message "focus a near subject". When the user focuses the flower 30 by autofocusing, and presses the shutter button, the distance (distance on the image plane) to the flower 30 is calculated on the basis of AF information at this time. Then, the user focuses the house 32 in accordance with a guide message "focus a subject on the far side", and presses the shutter button, a distance to the house 32 is calculated similarly. Consequently, a lower limit s'_near and a upper limit s'_far of the distance range can be designated. In FIG. 4A, the near subject and the subject on the far side are designated in this order. However, the two subjects may be designated in an arbitrary order, and the near subject and the farther subject are automatically recognized as the lower limit and the upper limit, respectively.

Figure 4B:
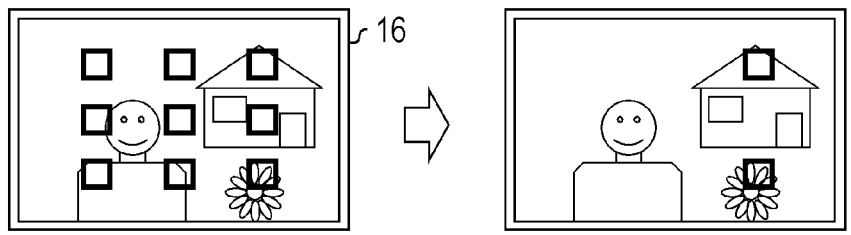

FIG. 4B shows an example of a method of automatically determining a distance range. It is assumed that the image pickup apparatus 1 has a plurality of autofocusing ranging points (nine points in FIG. 4B). First, the distance range designation unit 132 acquires distances at the respective ranging points by implementing automatic focusing for the respective ranging points. Then, the distance range designation unit 132 selects two points from the plurality of ranging points, to set a nearer one and a farther one of the two points to the lower limit s'_near of the distance range and the upper limit s'_far of the distance range, respectively. At this time, when two of a minimum distance point and a maximum distance (except for infinity) point are selected, it is possible to set a distance range such that most of the objects in the image is included. The right side of FIG. 4B shows a state where two of the minimum distance point and the maximum distance point are selected. Of course, a method of selecting two points may be determined in any manner. For example, a point at the center of the image (because there is a high possibility that an importance subject is imaged at the center of the image) and the maximum distance point may be selected. Alternatively, the minimum distance point and an intermediated distance point may be selected. By such a method, the distance range can be automatically determined on the basis of the image, and hence it is possible to eliminate the labor and time for designation by the user.

Figure 4C:
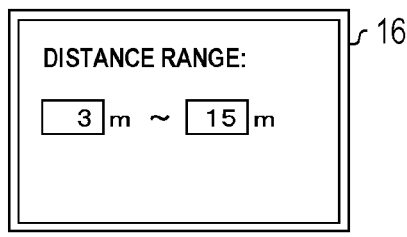

The lower limit value and the upper limit value of the distance range may be input by the user. For example, a setting input screen as in FIG. 4C, is displayed on the display unit 16, and numerical values of the lower limit and the upper limit of the distance range are input, or selected from a list, so that the distance range can be directly set.

Figure 4D:
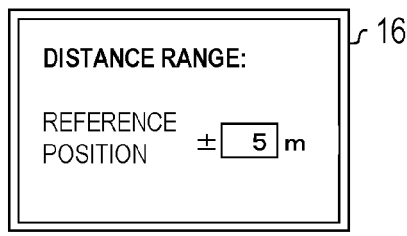

Alternatively, the range may be able to be designated with a relative distance to a reference position as in FIG. 4D. The relative distance includes a range in which the reference position is centered (example: reference position ±5 m), a far side distance from the reference position (example: reference position +10 m), a near side distance from the reference position (example: reference position −7 m), respective distances on the near side and the far side (example: reference position −3 m to +8 m), and the like. The reference position may be fixed, or may be designated by the user. For example, a position of the subject focused by the user can be selected as the reference position.

<Second Embodiment>

A second embodiment of the present invention will be described. The second embodiment is different from the first embodiment in that a focused image is utilized as one of images for distance measurement, and a focusing position of the focused image is set as a lower limit (or an upper limit) of a distance range r. Hereinafter, parts different from the first embodiment will be mainly described. A configuration of an image pickup apparatus 1 is similar to that of the first embodiment, and therefore will be described by using the same reference numerals.

Figure 6A:
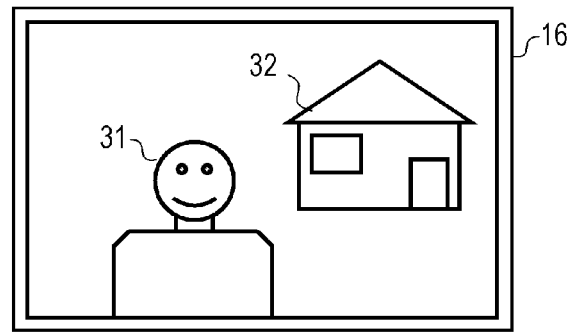
FIG. 6A and FIG. 6B are diagrams for illustrating designation of a distance range and setting of a photographing condition according to the second embodiment.
Figure 6B:
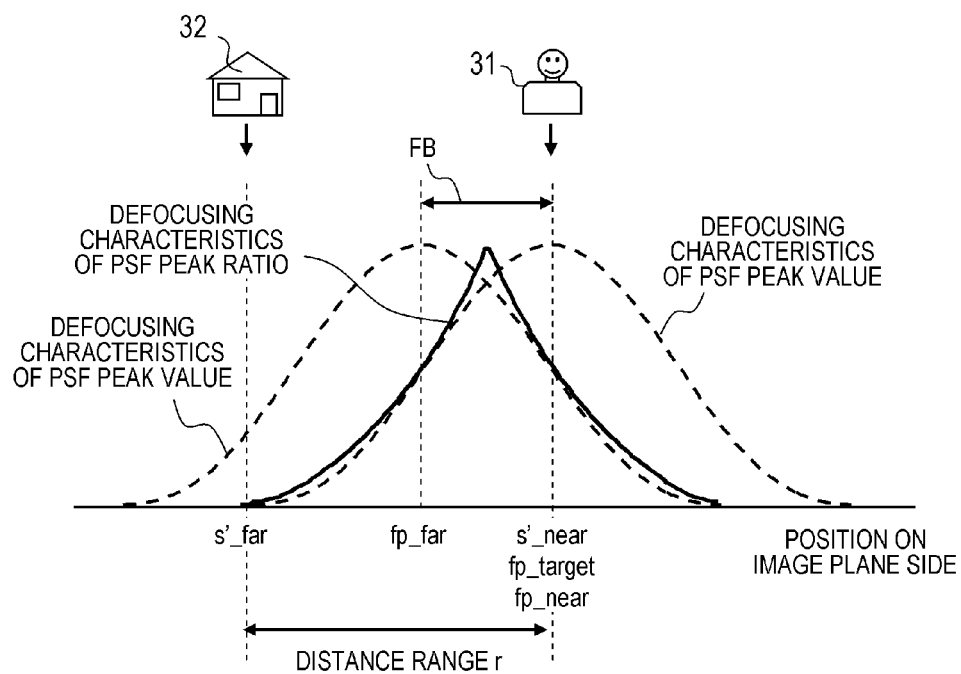

The operation associated with distance measurement of the image pickup apparatus 1 will be described with reference to FIG. 5, FIG. 6A, and FIG. 6B. FIG. 5 is a flowchart showing the flow of the distance measurement of the second embodiment. FIG. 6A and FIG. 6B each diagrams for illustrating designation of a distance range and setting of a photographing condition.

When a user operates an input unit 15 to instruct the user to perform distance measurement, capturing of images starts from an image pickup device 11, and the images captured are sequentially displayed on a display unit 16 (Step S50). FIG. 6A shows an example of an image displayed on the display unit 16. In the image, a person 31, and a house 32 are imaged in this order from the front. Hereinafter, a user operation for acquiring a focused image, in which the person 31 is focused, and acquiring distance information from the person 31 to the house 32, and processes by the image pickup apparatus 1 will be described.

First, a distance range designation unit 132 requests the user to designate the longest position (upper limit of a distance range) (Step S51). For example, a guide message "focus the farthest object" is simply overlay displayed on the display unit 16. When the user focuses a ranging point of autofocusing on a part of the house 32, a control unit 12 performs automatic focusing (Step S52). Consequently, it is possible to acquire an object distance s_far to the house 32 from an imaging optical system 10.

Thereafter, the distance range designation unit 132 displays a guide message "photograph" on the display unit 16, to encourage the user to photograph a focused image. When the user focuses a desired subject (person 31), and presses a shutter button, the control unit 12 acquires an object distance s_near to the person 31 (Step S53). Thus, in this embodiment, the subject position in the focused image is utilized as the lower limit (shortest position) of the distance range r, so that designation operation of the distance range is simplified.

The distance range designation unit 132 sets a distance range, which is a target of the distance measurement, on the basis of the object distances s_near and s_far of the two points, which are obtained in Steps S52 and S53 (Step S54). Specifically, the distance range designation unit 132 converts the object distances s_near and s_far into distances s'_near and s'_far on the image plane side, respectively, to set s'_near and s'_far as the lower limit of the distance range and the upper limit of the distance range, respectively, similarly to the first embodiment.

A photographing condition determination unit 133 determines an F-number and a focus bracket (FB) amount such that the distance range r designated by s'_near and s'_far (=s'_near−s'_far) is within a measurable range (Step S55). As shown in FIG. 6B, in this embodiment, a lower limit s'_near of the distance range, a focusing position fp_target of the focused image, and a focusing position fp_near of an image for distance measurement on the near side are the same, and therefore it should be noted that the measurable range becomes narrower than that of the first embodiment. Specifically, as apparent from FIG. 6B, the measurable range is ½ of an interval between primary minimum peaks on the front and back sides in the defocusing characteristic of PSF peak value (not depend on the focus bracket amount). The interval between the primary minimum peaks on the front and back sides in the defocusing characteristic of the PSF peak value is about 15 $F^2\lambda$, and therefore a measurable range R' of the second embodiment is R'=about 7.5 $F^2\lambda$.

For example, when the focal distance of the imaging optical system 10 is f=10 mm, and the object distance of the person 31 is s_near=−1000 mm, and the object distance of the house 32 is s_far=−10000 mm, s'_near and s'_far become s'_near=10.101 mm and s'_far=10.010 mm, respectively, the distance range r becomes r=s'_near−s'_far=0.091 mm.

In order that the distance range r is within the measurable range R' (r≤R'), the F-number is simply set such that r≤7.5 $F^2\lambda$ is satisfied. When r=0.091 mm and λ=550 nm are substituted in the aforementioned Formula,

F>4.70 is obtained. As an F-number that is larger than 4.70 and can be set by the imaging optical system 10, for example,

F=5.0 is determined.

Then, by substituting F=5.0, k=3.3, and λ=550 nm into Formula 7,

FB=3.3×$F^2\lambda$=45 μm is determined as the focus bracket amount.

Then, the photographing condition determination unit 133 calculates a focusing position fp_far of the image for distance measurement (Step S56). As apparent from FIG. 6B, the focusing position fp_near of the image for distance measurement on the near side is the same as the lower limit s'_near of the distance range, and therefore fp_far=fp_near−FB=10.056 mm is determined as the focusing position fp_far.

When the photographing condition is established, the control unit 12 automatically switches the F-number, to capture the focused image at the focusing position fp_target and to capture the image for distance measurement at the focusing position fp_far (Step S57). That is, two images are captured according to the aforementioned photographing condition, to be stored in the memory 131. Subsequent processes are similar to those of the first embodiment.

With the configuration of this embodiment, which is described above, a function effect that is similar to that of the first embodiment is obtained. In addition, in this embodiment, since two images are simply photographed, hence it is possible to shorten a processing time. Additionally, an operation for focusing a subject in a focused image is combined with an operation for designating a distance range, and hence there is an advantage that the operation is simplified.

In the aforementioned description, the distance range is set on the far side from the subject position in the focused image. However, on the contrary, the distance range may be set on the near side from the subject. In this case, the user is made to simply designate the shortest position. Additionally, also in this embodiment, similarly to the first embodiment, a photographing condition can be determined by using a photographing condition table. The method of designating the subject position or the longest position (or the shortest position) also is not limited to the aforementioned method, and any method may be employed.

<Third Embodiment>

A third embodiment of the present invention will be described. In the first embodiment, in a case where the designated distance range r exceeds the measurable range R, a user is required to redesignate the distance range. On the contrary, in the third embodiment, the distance range r is divided into n small ranges r1 to rn, each of which is smaller than the measurable range R, and the distance is independently calculated in each small range, thereby enabling distance measurement in a range r which is wider than the measurable range R. Hereinafter, parts different from the first embodiment will be mainly described.

In the process in Step S25 of FIG. 2, a distance range designation unit 132 compares the distance range r with the measurable range R. In a case of r≤R, a process is performed similarly to the first embodiment. In a case of r>R, the distance range r is divided into the plurality of small ranges. As long as the number n of division and the small range widths r1 to rn satisfy the following conditions, the number n of division and the small range widths r1 to rn may be determined in any manner.

$r1, \ldots, rn \leq R$ $r1+ \ldots +rn \geq R$ $n > 1$

Thereafter, processes in Steps S26 and S27 of FIG. 2 are performed for each of the small ranges, thereby determining a photographing condition of images for distance measurement for measuring each small range. Subsequent processes are similar to those of the first embodiment.

Figure 7A:
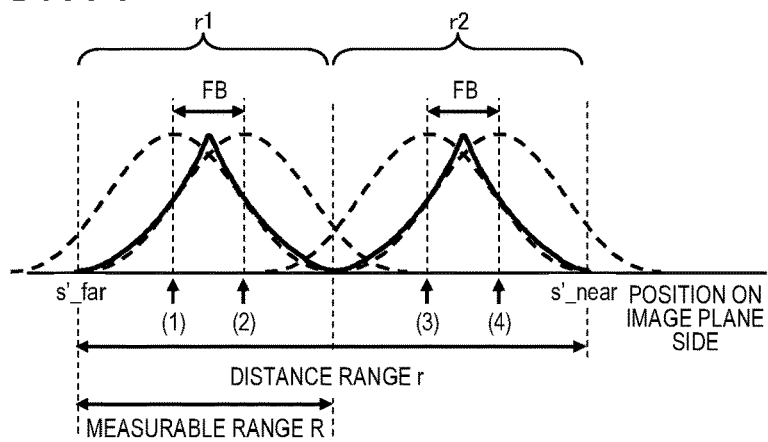
FIG. 7A to FIG. 7C show a variation of the division of a distance range of a third embodiment.
Figure 7B:
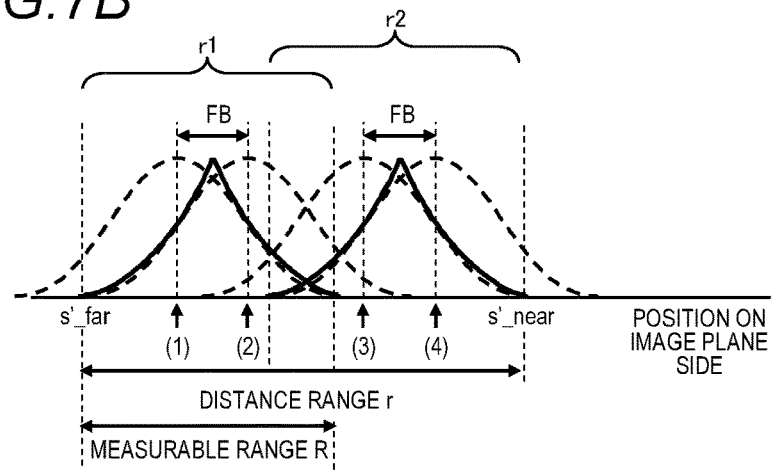
Figure 7C:
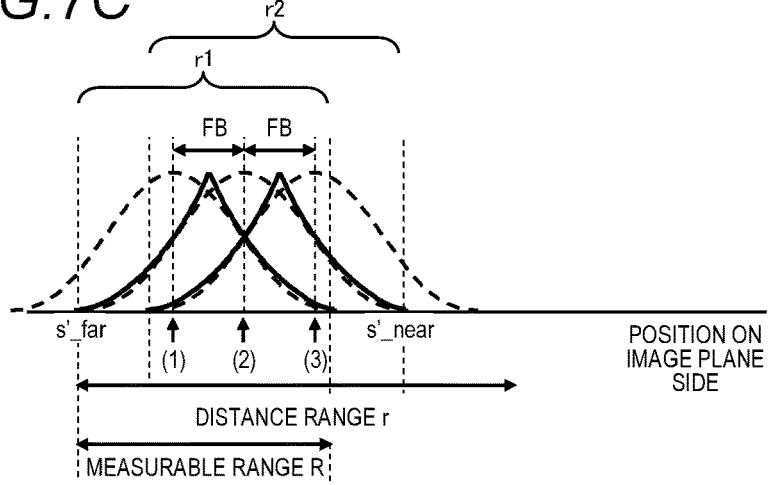

FIG. 7A to FIG. 7C show examples of a variation of the division. FIG. 7A shows a method of equally dividing the designated distance range r into n small ranges. In the example of FIG. 7A, the designated distance range r is divided into two of small ranges r1 and r2. Positions of the arrows (1) to (4) show focusing positions of images for distance measurement. That is, it is found that an about double distance range on the image side can be measured by using the four images for distance measurement. FIG. 7B shows an example of setting the overlapped part (margin) between the small ranges r1 and r2. As compared to FIG. 7A, a total of the distance range r becomes narrow by the width of the overlapped part. However, the distance corresponding to the overlapped part can be improved in accuracy by integrating calculation results in the two small ranges r1 and r2. Particularly, on the boundary part between the small ranges, a PSF peak ratio comes close to zero, and is likely to be influenced by noise, and therefore the effect obtained by providing the overlapped part is large. FIG. 7C shows an example of sharing one of the images for distance measurement in the two small ranges r1 and r2 that are adjacent. That is, an image for distance measurement on the near side in the small range r1 is used as an image for distance measurement on the far side in the small range r2. This method has an advantage that the number of photographed images can be reduced, although a total of the distance range r is narrower compared to the methods of FIG. 7A and FIG. 7B.

With the configuration of this embodiment, which is described above, a function effect that is similar to that of the first embodiment is obtained. In addition, this embodiment has the effect that accurate distance measurement can be implemented in a whole distance range, also in a case where the designated distance range exceeds a range measurable by two images. FIG. 7A to FIG. 7C show examples of dividing the range into two, but any number of small ranges (any division number) may be employed. Additionally, the widths of the small ranges may be different for each small range.

<Other Embodiment>

The configuration described in each of the first to third embodiments is merely one embodiment of the present invention, and does not intend to limit the present invention. For example, in each of the aforementioned embodiments, the method of calculating a distance on the basis of the value of the PSF peak ratio is exemplified. However, the present invention can be applied to other distance calculating methods. As long as the method is a distance calculating method using a characteristic in which a distance range that is calculable from two images is changed in accordance with photographing conditions of the two images, an effect of the present invention is obtained. For example, the present invention can be applied to a method of calculating a distance on the basis of not a PSF peak ratio, but a correlation amount (normalized cross correlation or the like) of a PSF, which is estimated from correlation of an image. As two images whose blur amounts are different, two images that are photographed at different focusing positions are used. However, two images that are photographed at different F-numbers without changing a focusing position can be used. In a case of this method, as a photographing condition, a focusing position and two kinds of F-numbers are determined.

<Implementation Examples>

A distance measurement technology of the aforementioned present invention can be preferably applied to, for example, an image pickup apparatus such as a digital camera and a digital camcorder, an image processing apparatus or a computer that performs an image process to image data obtained by an image pickup apparatus, and the like. Additionally, the technology of the present invention can be also applied to such an image pickup apparatus, or various electric apparatuses that incorporate image processing apparatuses (including a mobile phone, a smartphone, a slate terminal, and a personal computer). In the aforementioned embodiment, the functions of distance measurement are incorporated in the image pickup apparatus body. However, the functions of distance measurement may be configured in any manner. For example, the functions of distance measurement may be incorporated in a computer that has an image pickup apparatus, and the computer may acquire images photographed by the image pickup apparatus, and calculate a distance on the basis of the acquired images. Or, the function of distance measurement may be incorporated in a computer that is network-accessible by cable or by radio, the computer may acquire a plurality of images via a network, and a distance may be calculated on the basis on the acquired images. Obtained distance information can be utilized for various image processes, for example, image area division, generation of a stereo image or a depth image, emulation of a blur effect, and the like.

Specific mounting to the aforementioned apparatus is possible by both software (programs) and hardware. For example, by storing a program in a memory of a computer (microcomputer, FPGA, or the like) incorporated in an image pickup apparatus or an image processing apparatus, and causing the computer to implement the program, various processes for attaining an object of the present invention may be implemented. Additionally, it is also preferable to provide a dedicated processor such as ASIC, which implements all or a part of the processes of the present invention by a logic circuit.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed calculating systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-015649, filed on Jan. 30, 2013, which is hereby incorporated by reference herein in its entirety.

What is claimed is:

1. An image processing apparatus for calculating distance information in a depth direction of an object in an image by using two images whose blur amounts are different, the image processing apparatus comprising:
a memory storing a program; and
a processor operating according to the program, the processor functioning as units comprising:
(1) an acquisition unit that acquires distance range information for designating a range of distance to be calculated;
(2) a determination unit that determines a same F-number and respective focusing positions of the two images to be photographed, on the basis of the distance range information; and
(3) a calculation unit that calculates the distance information in the depth direction of the object in the range of distance to be calculated, on the basis of the difference in the blur amounts of the two images photographed with the F-number and the respective focusing positions determined by the determination unit,
wherein the determination unit determines the F-number such that the F-number satisfies the following formula:

$$F \geq \sqrt{\frac{r}{(15-k) \times \lambda}}$$

where F is the F-number, r is the range of distance to be calculated, k is a predetermined coefficient, and λ is a wavelength of light.

2. The image processing apparatus according to claim 1, wherein the calculation unit changes the range of a distance calculable from the two images in accordance with the F-number, and
wherein the determination unit determines the F-number such that a range designated by the distance range information is within the range of the distance that is calculable from the two images.

3. The image processing apparatus according to claim 1, wherein the calculation unit calculates the distance information on the basis of a ratio of PSF peak values of the two images.

4. The image processing apparatus according to claim 1, wherein the calculation unit calculates the distance information on the basis of a correlation amount of the two images.

5. The image processing apparatus according to claim 2, wherein the determination unit divides the range designated by the distance range information into a plurality of small ranges, each of which is smaller than the maximum range of the distance that is calculable from the two images, and determines the F-number of each image used in the distance calculation of each small range when the range designated by the distance range information exceeds a maximum range of the distance that is calculable from the two images.

6. The image processing apparatus according to claim 2, wherein the determination unit outputs a result indicating that there is no F-number enabling a distance calculation in the range designated by the distance range information when the range designated by the distance range information exceeds a maximum range of the distance calculable from the two images.

7. The image processing apparatus according to claim 2, wherein the determination unit decreases the F-number at the times of photographing of the two images as the range designated by the distance range information decreases.

8. The image processing apparatus according to claim 2, wherein the determination unit increases a focus bracket amount that is the difference between focusing positions of the two images, as the range designated by the distance range information decreases when the F-number is unable to be changed.

9. An image pickup apparatus comprising:
an imaging unit; and
the image processing apparatus according to claim 1,
wherein the imaging unit photographs a plurality of images in accordance with the F-number and the focusing positions determined by the image processing apparatus, and
wherein the image processing apparatus calculates a distance in a depth direction of an object in the images, by using the plurality of images that are photographed by the imaging unit.

10. The image pickup apparatus according to claim 9, wherein the processor further functions as a designation unit that instructs a user to designate a range of a distance to be calculated.

11. The image pickup apparatus according to claim 10, wherein the processor further functions as the designation unit that has:
a unit that displays an image acquired from the imaging unit on a display unit, and instructs the user to designate two points in the displayed image;
a unit that acquires distances in the depth direction of the two points by performing automatic focusing for the designated two points; and
a unit that sets, as the range of the distance to be calculated, a range in which the shorter one and the longer one of the distances of the two points are defined as a lower limit and an upper limit, respectively.

12. The image pickup apparatus according to claim 10, wherein the processor further functions as the designation unit that has:
a unit that acquires distances in the depth direction of two points by making the user perform an operation of automatic focusing twice; and
a unit that sets, as the range of the distance to be calculated, a range in which the shorter one and the longer one of the distances of the two points are defined as a lower limit and an upper limit, respectively.

13. The image pickup apparatus according to claim 10, wherein the designation unit has a unit that instructs the user to input a lower limit and an upper limit of the range of the distance to be calculated.

14. The image pickup apparatus according to claim 10, wherein the designation unit has a unit that designates the range of the distance to be calculated by a relative distance to a reference position.

15. The image processing apparatus according to claim 1, wherein the determination unit obtains the F-number corresponding to the range of distance to be calculated, designated by the distance range information, from a table in which each range of distance is associated with an F-number.

16. An image processing method of calculating distance information in a depth direction of an object in an image by using two images whose blur amounts are different, the image processing method comprising:

acquiring distance range information for designating a range of a distance to be calculated;

determining a same F-number and respective focusing positions of the two images to be photographed, on the basis of the distance range information; and calculating the distance information in the depth direction of the object in the range of distance to be calculated, on the basis of the difference in the blur amounts of the two images photographed with the F-number and have respective focusing positions that have been determined, wherein the F-number is determined such that the F-number satisfies the following formula:

$$F \geq \sqrt{\frac{r}{(15-k) \times \lambda}}$$

where F is the F-number, r is the range of distance to be calculated, k is a predetermined coefficient, and $\lambda$ is a wavelength of light.

* * * * *